(No Model.)

J. W. HARRIS.
POCKET KNIFE.

No. 436,659. Patented Sept. 16, 1890.

WITNESSES:
Fred G. Dieterich
P. B. Turpin

INVENTOR:
J. W. Harris.
BY
Munn & Co
ATTORNEYS

UNITED STATES PATENT OFFICE.

JOSHUA W. HARRIS, OF FREDERICKSBURG, VIRGINIA, ASSIGNOR OF ONE-HALF TO THOMAS P. WALLACE, OF SAME PLACE.

POCKET-KNIFE.

SPECIFICATION forming part of Letters Patent No. 436,659, dated September 16, 1890.

Application filed February 12, 1890. Serial No. 340,157. (No model.)

*To all whom it may concern:*

Be it known that I, JOSHUA W. HARRIS, of Fredericksburg, in the county of Spottsylvania and State of Virginia, have invented a new and useful Improvement in Pocket-Knife Handles, &c., of which the following is a specification.

This invention is an improvement in handles for knives, screw-drivers, gimlets, small saws, &c.; and the invention consists in certain features of construction and novel combinations of parts, as will be hereinafter described and claimed.

Figure 1:
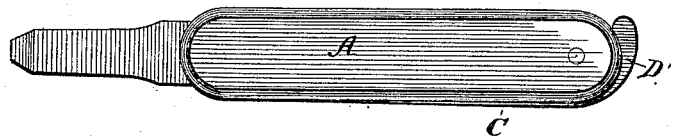
Figure 2:
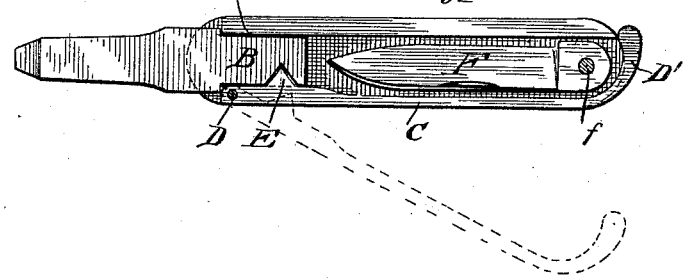
Figure 3:
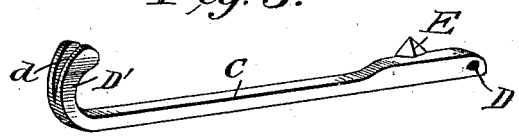
Figure 4:
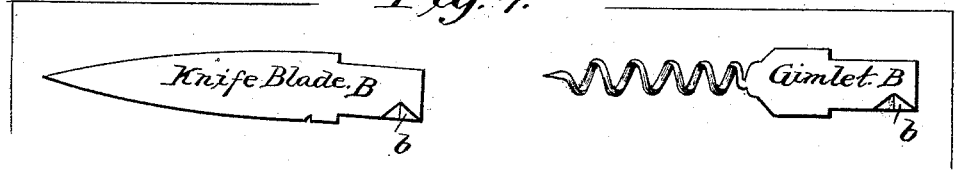

In the drawings, Figure 1 is a side view of the handle with a screw-driver held therein. Fig. 2 is a side view with one side removed, the locking arm or bar being shown open in dotted lines. Fig. 3 is a detail view of the locking arm or bar, and Fig. 4 shows in detail a number of tools adapted for use in my improved handle.

The main handle portion or frame A of the device is adapted to be carried in the pocket when not in use, and to be grasped by the hand in the use of the device. This handle A has its back and sides closed and its front open, and is provided at one end with the socket $a$ to receive the shank B of the tool it is desired to use, whether such shank be that of a screw-driver, as shown in Figs. 1 and 2, or of gimlet, knife-blade, can-opener, awl, saw, or pruning-blade, as shown in Fig. 4, or of any other tool which it may be desired to use in the handle.

In connection with the main handle portion socketed at $a$, as described, I provide the locking or securing bar C, by which to receive the said socket, such bar being, by preference, constructed as shown, and pivoted at D to the handle portion A, near the socket $a$, and arranged when turned out, as indicated in dotted lines, Fig. 2, to permit the insertion and removal of the tool, and when turned in, as shown in full lines, Figs. 1 and 2, to secure the tool with its shank in said socket. When in closed position, as shown in Fig. 1, the securing-bar closes the open side of the handle. The bar C may be retained in such closed position by the hand grasping the handle; but it is preferred to provide it with a portion D′, arranged to be sprung into and out of engagement with the handle. This portion D′ is by preference arranged at the free end of the securing-bar and is curved, as shown, so it will spring over the end of handle A opposite the socket $a$, so that the bar C will be self-held in closed position, but may be conveniently released by pushing the end D′ forward out of engagement with the handle to free the securing-bar from the shank of the tool held in socket $a$.

To enable the securing-bar to positively secure the shank of the tool, I provide such securing-bar near its pivoted end with a spur or projection E, extending from its inner side and arranged in the closed position of the bar C to fit in a notch $b$ in the shank or tank of the tool, thus operating to secure the tool rigidly in place.

By preference a knife-blade F may be permanently secured in the end of the handle opposite socket $a$, as shown, the blade being pivoted at $f$ to the handle and arranged to fold into the handle or turn out to position for use. When turned out to position for use, this blade is secured and locked open by the end D′ of the bar C, such end being notched or slotted at $d$ to fit on opposite sides of the blade F. This prevents the blade from closing accidentally, and so prevents any cutting of the hands from such cause.

Having thus described my invention, what I claim as new is—

1. The combination of the handle body or frame having at one end a socket to receive the tool-shank, the knife-blade pivoted in the end of the handle opposite the said socket and arranged to fold into the handle, and the securing-bar pivoted at one end to the handle-body at the socketed end of the latter, and having near such end a spur to engage the tool-shank, and having at its free end a spring portion to engage the end of the handle, substantially as set forth.

2. The improved device herein described, consisting of the handle body or frame having at one end a socket to receive the tool-shank, the knife-blade pivoted at the opposite end of said handle and arranged to fold therein, and the securing-bar pivoted at one end to the handle-body at the socketed end thereof, constructed at such end to interlock with the tool-shank, and having at its free end a spring portion to engage the end of the handle, such free end being curved and slitted at *d* to receive the blade when the latter is opened, whereby such blade may be locked in open position by the securing-arm, all substantially as and for the purposes set forth.

3. The combination of the handle body or frame having in one end a socket to receive the tool-shank, and one side open and its opposite side closed, the bar pivoted at one end in the handle-body adjacent to the socket end thereof, and arranged when closed to fit in the open side of the frame, and having at its swinging end a portion to spring into and out of engagement with the handle body or frame, substantially as set forth.

4. The improved device, substantially as herein described, consisting of the handle body or frame comprising side plates having between them at one end an unobstructed socket into which the tool-shank may be inserted and from which it may be withdrawn, and the arm or bar C, pivoted at one end between the said side plates adjacent to the socket, provided near such end with a spur to enter a seat or notch in the tool-shank, and provided at its opposite or free end with a curved spring portion arranged and adapted to spring into and out of engagement with the end of the handle body or frame, all substantially as and for the purposes set forth.

JOSHUA W. HARRIS.

Witnesses:
 D. S. RUSSELL,
 S. G. WALLACE, Jr.